Figure 1:
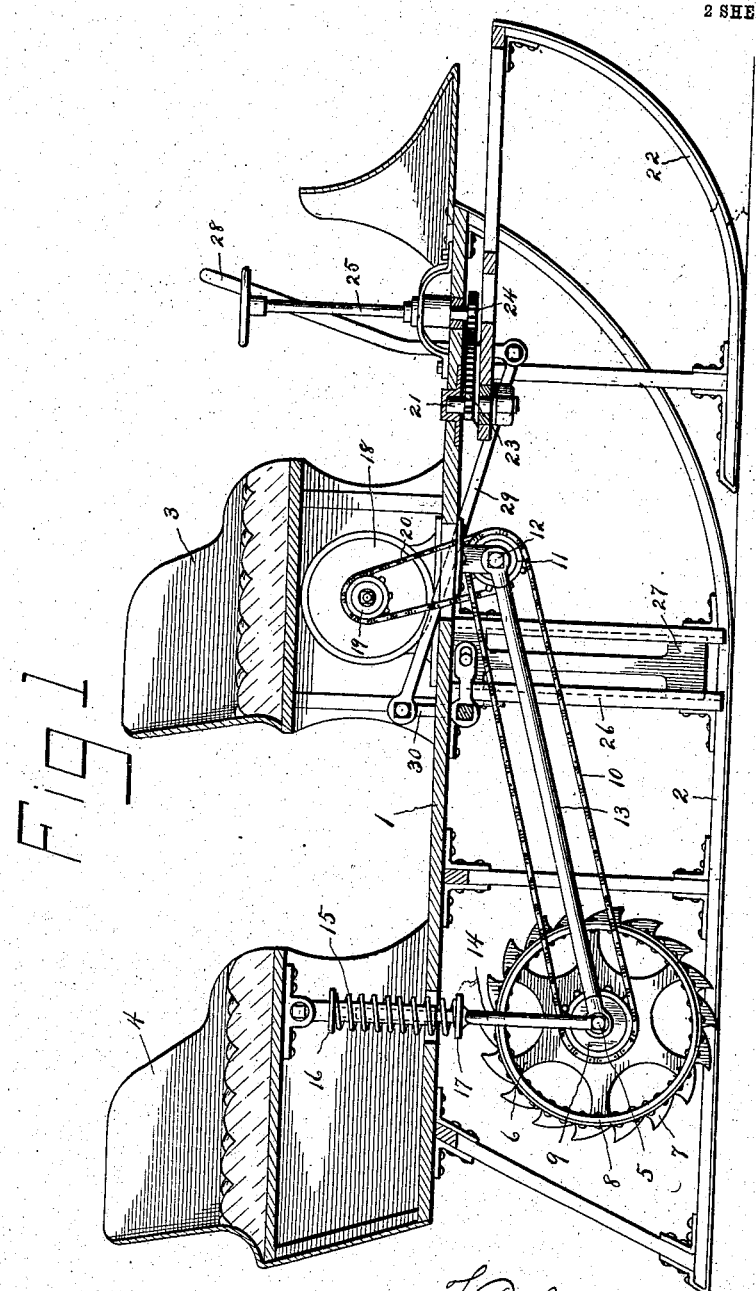

No. 814,964. PATENTED MAR. 13, 1906.
F. P. JORDAN.
MOTOR CUTTER.
APPLICATION FILED JUNE 13, 1905.

2 SHEETS—SHEET 1.

WITNESSES:
Chas. K. Davies.

F. P. Jordan, INVENTOR

BY Shepherd and Parker
Attorneys.

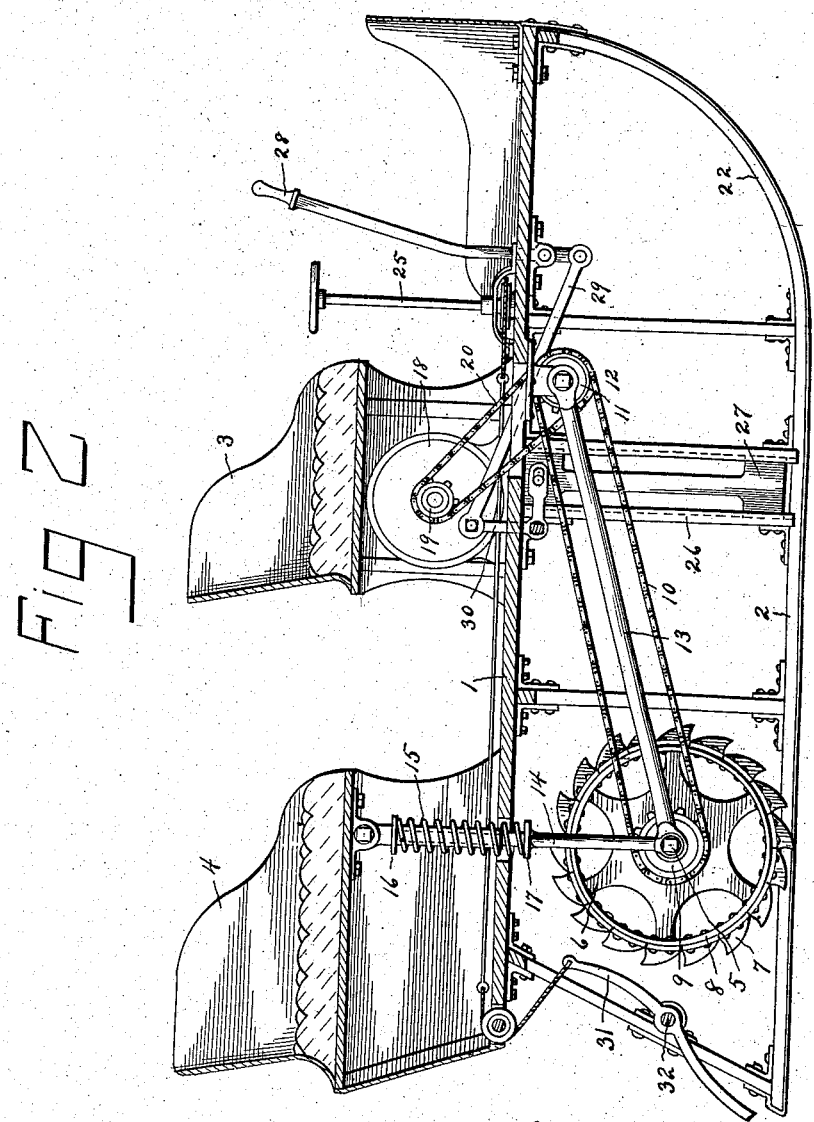

UNITED STATES PATENT OFFICE.

FRANK P. JORDAN, OF NEW YORK, N. Y.

MOTOR-CUTTER.

No. 814,964.   Specification of Letters Patent.   Patented March 13, 1906.

Application filed June 13, 1905. Serial No. 265,072.

*To all whom it may concern:*

Be it known that I, FRANK P. JORDAN, a citizen of the United States, residing at New York, in the county of New York and State of New York, have invented certain new and useful Improvements in Motor-Cutters, of which the following is a specification.

My invention relates to sleighs, and to that particular class known as "motor-cutters."

The object of my invention is to provide a sleigh the propelling-wheels of which are resiliently mounted to take the jar from the sleigh when the driving-wheels strike an uneven place in the road.

It is a further object of my invention to provide a sleigh of the class described which is easily steered and at all times under the control of the operator.

A further object of my invention is to provide a sleigh with a driving-wheel the engaging teeth of which will not clog up with snow and ice.

With these and other objects in view the present invention consists in the combination and arrangement of parts as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a sectional view of my improved motor-cutter. Fig. 2 is a similar view illustrating a modified form of steering-gear.

Referring to the drawings, in which like numerals of reference indicate corresponding parts throughout both the views, 1 is the floor of a sleigh provided with runners 2 and seats 3 and 4. On axle 5 are keyed drive-wheels 6, which are provided with teeth 7 upon their rims 8. A sprocket-wheel 9, also keyed to axle 5, is connected by a chain 10 to sprocket-wheel 11. The latter sprocket-wheel is mounted on a short shaft 12, secured by hangers to the under side of the floor 1. Rods 13, pivoted at their forward ends to shaft 12, form bearings at their rear ends for axle 5, maintaining at all times the same distance between said shaft and axle, thereby preventing an uneven tension of chain 10. The axle 5 is connected with the under side of seat 4 by sectional rods 14, provided with coil-springs 15, which exert a pressure against collars 16 and 17, fixed to said sections, which tends to force said axle downward, thereby keeping the teeth of drive-wheel 6 in contact with the snow.

Under the seat 3 is located motor 18, which is connected by sprocket 19 and chain 20 to a sprocket (not shown) on shaft 12. By this means power is transmitted from the motor to shaft 12 and through it to the drive-wheels 6.

To the forward part of the sleigh are pivoted at 21 a pair of steering-runners 22, which carry concentrically with pivot 21 a segmental rack 23. A pinion 24, mounted on the end of a steering-post 25, meshes with rack 23 and operates through said rack to turn the steering-runners when the post 25 is turned.

Vertically movable in guides 26 is a brake-shoe 27, which is operated by brake-lever 28 through connecting-rod 29 and bell-crank 30, said brake-lever being located in a position convenient to the operator.

In the modification shown in Fig. 2 the steering-shaft is connected by rods and chains to levers 31, pivoted on shaft 32, which is supported by the rear supports of the sleigh. These levers are mounted on each side of the sleigh and are so connected with the steering-post that when said post is turned in one direction one of the levers will come in contact with the snow, and a reverse movement of said post will lift said lever and cause the opposite one to engage the snow. In this way the forward end of the sleigh will be turned to one side or the other and the direction of its movement thus controlled.

The operation of my device is as follows: The revolving motor-shaft transmits motion through chains 20 to shaft 12, which in turn revolves axle 5 and drive-wheels 6, mounted thereon. The spring 15 forces the drive-wheels downward into engagement with the snow, which causes the sleigh to move forward. Should the drive-wheels encounter any obstacle, they will be forced upward against the stress of springs 15 and no jar will be felt by the occupants of the sleigh, such as would result if the drive-wheels were rigidly mounted. By turning the steering-wheel mounted on the upper end of post 25 the pinion 24 will turn rack 23 and the steering-runners to which it is attached, thus directing the course of the sleigh to the right or left, as desired. To stop the sleigh, the power is cut off, and brake-lever 28 is pulled backward. This operates through rod 29 and bell-crank 30 to force the brake-shoe 27 into frictional contact with the snow and the sleigh is speedily brought to a stop.

Having thus described my invention, what I claim as novel, and desire to secure by Letters Patent, is—

1. A sleigh having a flexible frame comprising a pivoted tube, a plunger in said tube and provided with a forked bearing end, a spring bearing on said tube and plunger, hanger-bars pivoted to the said fork and to the sleigh-body, and a motor-driven traction-wheel journaled in said forked bearing.

2. A sleigh having a pivotal steering portion at its front, a flexible frame comprising a pivoted tube, a plunger in said tube and provided with a forked bearing end; a spring bearing on said tube and plunger, hanger-bars pivoted to the fork and to the sleigh-body and a motor-driven traction-wheel journaled in the forked bearings; a transverse shaft and means for rotating the same, a brake-shoe at each side of the sleigh, and connections between said shoes and shaft for operating the same.

3. A sleigh having a motor-driven traction-wheel journaled in a flexible frame comprising a pivoted tube, a plunger in said tube provided with a forked end, and hanger-bars pivoted to said forked ends and to the sleigh; a transverse shaft supported on the sleigh, guideways at each side of the sleigh, brake-shoes in said ways and connected to be operated by said shaft, and means for rotating said shaft.

4. A sleigh having a motor-driven traction-wheel journaled in a flexible frame comprising a pivoted tube, a plunger in said tube provided with a forked bearing end, and hanger-bars pivoted to said forked end and to the sleigh; vertical guideways at each side of the sleigh, brake-shoes movable in said ways, a shaft and means for turning the same, and a slotted lever-arm on the shaft pivoted to each of said shoes.

In testimony whereof I affix my signature in presence of two witnesses.

FRANK P. JORDAN.

Witnesses:
JUNIUS M. GREEN,
JOSEPH KEMP.